United States Patent
Okamoto et al.

(10) Patent No.: US 8,519,052 B2
(45) Date of Patent: Aug. 27, 2013

(54) COMPOSITION FOR COATING AND MOLDED PRODUCT USING THE SAME

(75) Inventors: Kazuhiro Okamoto, Tokyo (JP); Kazuya Egawa, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/696,842

(22) PCT Filed: Apr. 4, 2011

(86) PCT No.: PCT/JP2011/058552
§ 371 (c)(1),
(2), (4) Date: Dec. 12, 2012

(87) PCT Pub. No.: WO2011/142195
PCT Pub. Date: Nov. 17, 2011

(65) Prior Publication Data
US 2013/0116375 A1    May 9, 2013

(30) Foreign Application Priority Data

May 11, 2010 (JP) .................................. 2010-109183

(51) Int. Cl.
*C08G 63/48* (2006.01)
(52) U.S. Cl.
USPC .............. 525/64; 525/166; 525/175; 525/176
(58) Field of Classification Search
USPC ..................... 525/64, 166, 175, 176
See application file for complete search history.

(56) References Cited

FOREIGN PATENT DOCUMENTS

| JP | 4-001255 | | 1/1992 |
|---|---|---|---|
| JP | 04-001255 | * | 1/1992 |
| JP | 8-217950 | | 8/1996 |
| JP | 9-132684 | | 5/1997 |
| JP | 2001-059034 | | 3/2001 |
| JP | 2003-327779 | | 11/2003 |
| JP | 2007-161940 | | 6/2007 |

OTHER PUBLICATIONS

International Search Report for PCT/JP2011/058552, mailed Jun. 21, 2011.

* cited by examiner

*Primary Examiner* — James J Seidleck
*Assistant Examiner* — Timothy Meagher
(74) *Attorney, Agent, or Firm* — Nixon & Vanderhye P.C.

(57) ABSTRACT

The present invention provides a resin composition for coating which is capable of exhibiting an excellent balance between coatability, impact resistance, moldability and chemical resistance, and capable of attaining a good coating appearance, for example, even when a large-size molded product is coated. The resin composition for coating according to the present invention comprises 84.9 to 98.9 parts by mass of the below-mentioned rubber-reinforced vinyl-based resin [A], 1 to 8 parts by mass of a polyester resin [B] and 0.1 to 7.1 parts by mass of a copolymer [C] of ethylene, a (meth) acrylic acid ester and carbon monoxide (with the proviso that a total amount of the components [A], [B] and [C] ([A] +[B] +[C]) is 100 parts by mass): [Rubber-reinforced vinyl-based resin [A]]

A rubber-reinforced vinyl-based resin comprising a rubber-reinforced copolymer resin [A1] obtained by polymerizing a vinyl-based monomer [b1] in the presence of a rubber polymer [a], or comprising the rubber-reinforced copolymer resin [A1] obtained by polymerizing the vinyl-based monomer [b1] in the presence of the rubber polymer [a], and a (co)polymer [A2] of a vinyl-based monomer [b2].

10 Claims, 1 Drawing Sheet

COMPOSITION FOR COATING AND MOLDED PRODUCT USING THE SAME

This application is the U.S. national phase of International Application No. PCT/JP2011/58552 filed 4 Apr. 2011 which designated the U.S. and claims priority to JP Patent Application No. 2010-109183 filed May 11, 2010, the entire contents of each of which are hereby incorporated by reference.

TECHNICAL FIELD

The present invention relates to a resin composition for coating and a molded product using the same.

BACKGROUND ART

Rubber-reinforced vinyl-based resins such as typically ABS resins have been extensively used in various applications such as vehicles, domestic appliances and building materials because of excellent coatability, impact resistance and moldability thereof. Among these applications, the rubber-reinforced vinyl-based resins have been frequently employed in the application field of vehicles in which the resins tend to be often subjected to coating treatment for imparting decorations thereto or improving a weather resistance thereof. However, these coated molded products may fail to have a good coating appearance, for example, owing to the problems concerning chemical resistance to thinners, coating adhesion property, etc.

As large-size coated molded products, there are known spoilers obtained by a blow-molding method (Patent Document 1). However, the blow-molding method tends to have a low productivity as compared to an injection-molding method, and also tend to suffer from problems such as limited degree of freedom of designing a shape of the molded products. On the other hand, the injection-molding method tends to suffer from coating defects owing to residual strain on a surface of the molded products, in particular, the large-size molded products tend to more remarkably suffer from such coating defects.

To solve the above conventional problems, there have been described various resin compositions comprising rubber-reinforced vinyl-based resins such as typically ABS resins which are improved in chemical resistance thereof, for example, there have been proposed thermoplastic resins comprising a rubber-reinforced styrene-based resin and a terpolymer of ethylene, a (meth)acrylic acid ester and carbon dioxide (Patent Document 1).

On the other hand, as the resin composition using a polyester resin having excellent mechanical strength and chemical resistance, there have been proposed thermoplastic resins comprising an ABS resin, a polyester resin and a terpolymer of ethylene, a (meth)acrylic acid ester and carbon dioxide (Patent Document 2).

However, the rubber-reinforced vinyl-based resins such as typically ABS resins tend to be insufficient in chemical resistance to organic solvents such as thinners although they are excellent in adhesion between the resins and coating films. For this reason, the rubber-reinforced vinyl-based resins tend to absorb the organic solvents such as thinners therein, so that the resins after coated tend to frequently suffer from coating defects such as so-called foaming on a surface of the coating film owing to the organic solvent volatilized in the resin after coating (depressions formed by volatilization of the organic solvent absorbed in the resins). On the other hand, the polyester resins exhibit an excellent chemical resistance to organic solvents such as thinners, but tend to be deteriorated in adhesion between the resins and coating films and therefore tends to be deteriorated in impact resistance owing to hydrolysis thereof when exposed to high temperatures. In addition, the rubber-reinforced styrene-based resins in the form of a non-crystalline resin and the polyester resins in the form of a crystalline resin tend to have a poor compatibility therebetween, and therefore tend to be limited in their applications when used in the form of a mixture thereof.

Accordingly, the above conventionally proposed respective compositions tend to fail to exhibit a sufficient balance between heat resistance, impact resistance, chemical resistance and coatability and therefore tend to be limited in applications when used as a coated product.

PRIOR ART DOCUMENTS

Patent Documents

Patent Document 1: Japanese Patent Application Laid-Open (KOKAI) No. 2008-56904
Patent Document 2: Japanese Patent No. 2884180

SUMMARY OF THE INVENTION

Problems to be Solved by the Invention

The present invention has been accomplished to solve the above problems. An object of the present invention is to provide a resin composition for coating which is capable of exhibiting an excellent balance between coatability, impact resistance, moldability and chemical resistance, and capable of attaining a good coating appearance, for example, even when a large-size molded product is coated, and a molded product obtained from the resin composition for coating.

Means for Solving the Invention

That is, in a first aspect of the present invention, there is provided a resin composition for coating comprising 84.9 to 98.9 parts by mass of the below-mentioned rubber-reinforced vinyl-based resin [A], 1 to 8 parts by mass of a polyester resin [B] and 0.1 to 7.1 parts by mass of a copolymer [C] of ethylene, a (meth)acrylic acid ester and carbon monoxide (with the proviso that a total amount of the components [A], [B] and [C] ([A] +[B] +[C]) is 100 parts by mass):
[Rubber-Reinforced Vinyl-Based Resin [A]]
A rubber-reinforced vinyl-based resin comprising a rubber-reinforced copolymer resin [A1] obtained by polymerizing a vinyl-based monomer [b1] in the presence of a rubber polymer [a], or comprising the rubber-reinforced copolymer resin [A1] obtained by polymerizing the vinyl-based monomer [b1] in the presence of the rubber polymer [a], and a (co)polymer [A2] of a vinyl-based monomer [b2].

In a second aspect of the present invention, there is provided a molded product comprising the above resin composition for coating.

In a third aspect of the present invention, there is provided an exterior part for automobiles which comprises the above resin composition for coating.

In a fourth aspect of the present invention, there is provided a spoiler comprising the above resin composition for coating.

Effect of the Invention

The resin composition for coating according to the present invention can exhibit an excellent balance between coatability, impact resistance, moldability and chemical resistance, and can attain a good coating appearance even when a large-size molded product is coated.

PREFERRED EMBODIMENTS FOR CARRYING OUT THE INVENTION

Figure 1A:
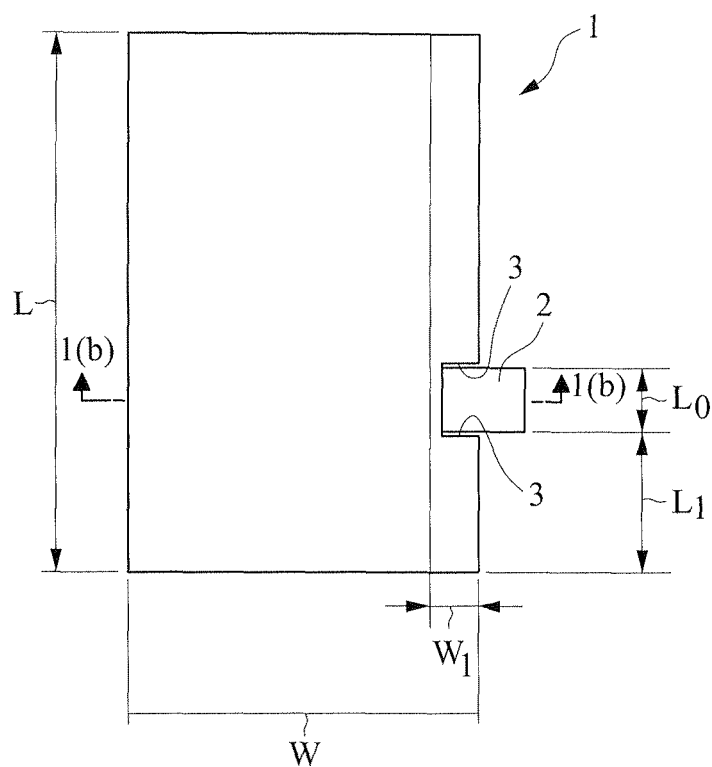
FIG. 1(a) is a bottom view of a test piece used in peel test as described in Examples.

The present invention is described in detail below. Meanwhile, the term "(co)polymerization" as used in the present invention means both homopolymerization and copolymerization, and the term "(meth)acrylic" as used in the present invention means both acrylic and methacrylic.

[1] Resin Composition for Coating:

The resin composition for coating according to the present invention comprises a specific rubber-reinforced vinyl-based resin [A], a polyester resin [B] and a copolymer [C] of ethylene, a (meth)acrylic acid ester and carbon monoxide. In the following description, the above respective components are occasionally referred to merely as the component [A], the component [B] and the component [C].

(1-1) Rubber-Reinforced Vinyl-Based Resin [A]:

The rubber-reinforced vinyl-based resin [A] comprises a rubber-reinforced copolymer resin [A1] obtained by polymerizing a vinyl-based monomer [b1] in the presence of a rubber polymer [a], or comprises the rubber-reinforced copolymer resin [A1] obtained by polymerizing the vinyl-based monomer [b1] in the presence of the rubber polymer [a], and a (co)polymer [A2] of a vinyl-based monomer [b2].

The rubber-reinforced copolymer resin [A1] obtained by polymerizing the vinyl-based monomer [b1] in the presence of the rubber polymer [a] may be usually in the form of either a graft copolymer formed by grafting the vinyl-based monomer to the rubber polymer or a non-graft component in which the vinyl-based monomer is not grafted to the rubber polymer (i.e., a (co)polymer produced by (co)polymerization between the vinyl-based monomers [b1] similarly to the above component [A2]). In addition, the graft copolymer may also include the rubber polymer [a] to which the (co)polymer of the vinyl-based monomer [b1] is not grafted. Among these rubber-reinforced vinyl-based resins [A], preferred are those rubber-reinforced vinyl-based resins comprising the rubber-reinforced copolymer resin [A1] obtained by polymerizing the vinyl-based monomer [b1] in the presence of the rubber polymer [a] and the (co)polymer [A2] of the vinyl-based monomer [b2].

The rubber polymer [a] may be in the form of either a homopolymer or a copolymer as long as the polymer is kept in a rubber-like state at room temperature. In addition, the rubber polymer [a] may be in the form of either a non-crosslinked polymer or a crosslinked polymer. Specific examples of the rubber polymer [a] include diene-based polymers (diene-based rubber polymers) and non-diene-based polymers (non-diene-based rubber polymers). These rubber polymers may be used alone or in combination of any two or more thereof.

Examples of the diene-based polymers include homopolymers such as polybutadiene, polyisoprene and polychloroprene; styrene-butadiene-based copolymer rubbers such as styrene-butadiene copolymers, styrene-butadiene-styrene copolymers and acrylonitrile-styrene-butadiene copolymers; styrene-isoprene-based copolymer rubbers such as styrene-isoprene copolymers, styrene-isoprene-styrene copolymers and acrylonitrile-styrene-isoprene copolymers; and natural rubbers. Meanwhile, the above respective copolymers may be in the form of either a block copolymer or a random copolymer. The above diene-based polymers may be used in combination of any two or more thereof.

Examples of the non-diene-based polymers include ethylene-α-olefin-based copolymer rubbers, acrylic rubbers, urethane-based rubbers, silicone-based rubbers, composite rubbers such as silicone-acryl-based IPN rubbers, and polymers obtained by hydrogenating a (co)polymer comprising a unit constituted from a conjugated diene-based compound. Meanwhile, the above respective copolymers may be in the form of either a block copolymer or a random copolymer. The above non-diene-based polymers may be used in combination of any two or more thereof. Among the above non-diene-based polymers, preferred are ethylene-α-olefin-based copolymer rubbers and acrylic rubbers.

The ethylene-α-olefin-based copolymer rubbers comprise an ethylene unit and a unit constituted from an α-olefin having 3 or more carbon atoms. Examples of the ethylene-α-olefin-based copolymer rubbers include ethylene-α-olefin-non-conjugated diene copolymer rubbers.

Examples of the α-olefin having 3 or more carbon atoms include propylene, 1-butene, 1-pentene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene and propyl-1-pentene.

Examples of the non-conjugated dienes include straight chain acyclic diene compounds such as 1,4-pentadiene, 1,4-hexadiene and 1,5-hexadiene; branched chain acyclic diene compounds such as 5-methyl-1,4-hexadiene, 3,7-dimethyl-1,6-octadiene, 5,7-dimethyl-1,6-octadiene, 3,7-dimethyl-1,7-octadiene, 7-methyl-1,6-octadiene and dihydromyrcene; and alicyclic diene compounds such as 5-methylene-2-norbornene, 5-ethylidene-2-norbornene, 5-propenyl-2-norbornene, 5-isopropylidene-2-norbornene, 5-cyclohexylidene-2-norbornene, 5-vinyl-2-norbornene, dicyclopentadiene, 1,4-cyclohexadiene, 1,4-cyclooctadiene, 1,5-cyclooctadiene, tetrahydroindene, methyl tetrahydroindene, dicyclopentadiene and bicyclo[2.2.1]-hepta-2,5-diene.

Specific examples of the above ethylene-α-olefin copolymer rubbers include ethylene-propylene copolymers, ethylene-1-butene copolymers, ethylene-1-pentene copolymers, ethylene-3-methyl-1-butene copolymers, ethylene-1-hexene copolymers, ethylene-3-methyl-1-pentene copolymers, ethylene-4-methyl-1-pentene copolymers, ethylene-3-ethyl-1-pentene copolymers, ethylene-1-octene copolymers, ethylene-1-decene copolymers and ethylene-1-undecene copolymers.

Specific examples of the above ethylene-α-olefin-non-conjugated diene copolymer rubbers include ethylene-propylene-5-ethylidene-2-norbornene copolymers, ethylene-propylene-dicyclopentadiene copolymers, ethylene-propylene-5-ethylidene-2-norbornene-dicyclopentadiene copolymers, ethylene-propylene-5-ethylidene-2-norbornene-5-vinyl-2-norbornene copolymers and ethylene-1-butene-5-ethylidene-2-norbornene copolymers.

The content of the ethylene unit constituting the above ethylene-α-olefin-based copolymer rubbers is usually 10 to 90% by mass, preferably 20 to 80% by mass and more preferably 30 to 70% by mass based on a total amount of the whole units contained in the copolymer rubbers. The weight-average molecular weight (Mw) of the above ethylene-α-olefin-based copolymer rubbers is usually 5,000 to 1,000,000 and preferably 30,000 to 300,000. When the Mw of the ethylene-α-olefin-based copolymer rubbers is excessively large, the resulting non-diene-based rubber-reinforced resin tends to be deteriorated in processability upon use. In addition, the ratio of a weight-average molecular weight (Mw) to a number-average molecular weight (Mn) [Mw/Mn] of the ethylene-α-olefin-based copolymer rubbers is usually not more than 10.

The above acrylic rubbers (acrylic rubber polymers) are not particularly limited as long as they are in the form of a (co)polymer produced from a monomer comprising an acrylic acid alkyl ester and/or a methacrylic acid alkyl ester.

The above monomer preferably comprises an acrylic acid alkyl ester, and especially preferably comprises an acrylic acid alkyl ester comprising an alkyl group having 1 to 12 carbon atoms. Examples of the acrylic acid alkyl ester include methyl acrylate, ethyl acrylate, n-propyl acrylate, isopropyl acrylate, n-butyl acrylate, isobutyl acrylate, tert-butyl acrylate, amyl acrylate, n-hexyl acrylate, n-octyl acrylate, 2-ethylhexyl acrylate, dodecyl acrylate, cyclohexyl acrylate, phenyl acrylate and benzyl acrylate. Among these compounds, especially preferred are n-butyl acrylate and 2-ethylhexyl acrylate. These acrylic acid alkyl esters may also be used in combination of any two or more thereof.

The above acrylic rubber polymers may be in the form of either a homopolymer produced using one kind of acrylic acid alkyl ester or a copolymer produced using two or more kinds of acrylic acid alkyl esters. Also, the acrylic rubber polymers may also be in the form of a copolymer produced using one or more kinds of acrylic acid alkyl esters and one or more kinds of compounds which are copolymerizable with the acrylic acid alkyl esters.

The compounds which are copolymerizable with the acrylic acid alkyl esters are not particularly limited. Examples of the compounds which are copolymerizable with the acrylic acid alkyl esters include methacrylic acid alkyl esters, monofunctional aromatic vinyl compounds, monofunctional vinyl cyanide compounds, diene compounds and polyfunctional vinyl compounds. These compounds may be used in combination of any two or more thereof.

The shape of the rubber polymer [a] used for forming the rubber-reinforced copolymer resin [A1] is not particularly limited. When the rubber polymer [a] has a particle shape, the volume-average particle diameter of the rubber polymer [a] is usually 30 to 2,000 nm, preferably 50 to 1,500 nm, and more preferably 100 to 1,000 nm. When the volume-average particle diameter of the rubber polymer [a] is excessively small, the composition obtained according to the present invention tends to be deteriorated in impact resistance. On the other hand, when the volume-average particle diameter of the rubber polymer [a] is excessively large, the resulting molded product tends to be deteriorated in appearance on a surface thereof. Meanwhile, the volume-average particle diameter as used herein may be measured by a laser diffraction method or a light scattering method.

In the case where the rubber polymer [a] is in the form of particles obtained by emulsion polymerization, as long as the volume-average particle diameter thereof lies within the above-specified range, there may also be used those large particles of the rubber polymer [a] which are enlarged by known methods as described, for example, in Japanese Patent Applications Laid-Open (KOKAI) Nos. 61-233010(1986), 59-93701(1984) and 56-167704(1981), etc.

As the method for producing the diene-based rubbers, acrylic rubbers and silicone-based rubbers as the rubber polymer [a], emulsion polymerization is preferably used in view of well-controlled average particle diameter thereof. In this case, the average particle diameter of these rubbers may be controlled by appropriately selecting production conditions such as kind and amount of emulsifier used, kind and amount of initiator used, polymerization time, polymerization temperature and stirring conditions. In addition, as the method for controlling the above volume-average particle diameter (particle size distribution) of the rubber polymer [a], there may be used the method of blending two or more kinds of rubber polymers [a] which are different in particle diameter from each other.

Examples of the vinyl-based monomer [b1] used for forming the rubber-reinforced copolymer resin [A1] include aromatic vinyl compounds, vinyl cyanide compounds, (meth) acrylic acid ester compounds, maleimide-based compounds and acid anhydrides. These compounds may be used in combination of any two or more thereof.

The aromatic vinyl compounds are not particularly limited as long as they are in the form of a compound having at least one vinyl bond and at least one aromatic ring. Specific examples of the aromatic vinyl compounds include styrene, α-methyl styrene, o-methyl styrene, p-methyl styrene, vinyl toluene, β-methyl styrene, ethyl styrene, p-tert-butyl styrene, vinyl xylene, vinyl naphthalene, monochlorostyrene, dichlorostyrene, monobromostyrene, dibromostyrene and fluorostyrene. These aromatic vinyl compounds may be used in combination of any two or more thereof. Among these aromatic vinyl compounds, especially preferred are styrene and α-methyl styrene.

Examples of the above vinyl cyanide compounds include acrylonitrile and methacrylonitrile. These vinyl cyanide compounds may be used in combination of any two or more thereof. Among these vinyl cyanide compounds, especially preferred is acrylonitrile.

Examples of the above (meth)acrylic acid ester compounds include methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, hexyl (meth)acrylate, cyclohexyl (meth)acrylate and phenyl (meth)acrylate. These (meth)acrylic acid ester compounds may be used in combination of any two or more thereof. Among these (meth)acrylic acid ester compounds, especially preferred is methyl methacrylate.

Examples of the above maleimide-based compounds include maleimide, N-methyl maleimide, N-butyl maleimide, N-phenyl maleimide, N-(2-methylphenyl) maleimide, N-(4-hydroxyphenyl) maleimide and N-cyclohexyl maleimide. These maleimide-based compounds may be used in combination of any two or more thereof. Among these maleimide-based compounds, especially preferred is N-phenyl maleimide. Meanwhile, as the other method of introducing a unit comprising the maleimide-based compound into the copolymer resin, there may be used, for example, the method of copolymerizing the resin with maleic anhydride and then subjecting the resulting copolymer to imidation reaction.

Examples of the above acid anhydrides include malic anhydride, itaconic anhydride and citraconic anhydride. These acid anhydrides may be used in combination of any two or more thereof.

Also, in addition to the above compounds, there may also be used the vinyl-based compounds having a functional group such as a hydroxyl group, an amino group, an epoxy group, an amide group, a carboxyl group and an oxazoline group, if required. Specific examples of the vinyl-based compounds include 2-hydroxyethyl (meth)acrylate, hydroxystyrene, N,N-dimethylaminomethyl (meth)acrylate, N,N-diethyl-p-aminomethyl styrene, glycidyl (meth)acrylate, 3,4-oxycyclohexyl (meth)acrylate, vinyl glycidyl ether, methacrylic glycidyl ether, acrylic glycidyl ether, methacrylamide, acrylamide, (meth)acrylic acid and vinyl oxazoline. These vinyl-based compounds may be used in combination of any two or more thereof.

As the vinyl-based monomer [b1] used for forming the rubber-reinforced copolymer resin [A1], there are preferably mainly used the following combinations of compounds.

(1) Combination of an aromatic vinyl compound and a vinyl cyanide compound; and (2) Combination of an aromatic vinyl compound, a vinyl cyanide compound and a maleimide-based compound.

In the above embodiment of the combination (1), the aromatic vinyl compound and the vinyl cyanide compound are used in amounts of usually 50 to 97% by mass and 3 to 50% by mass, respectively, and preferably 55 to 95% by mass and 5 to 45% by mass, respectively, based on 100% by mass of a total amount of the aromatic vinyl compound and the vinyl cyanide compound. Also, in the above embodiment of the combination (2), the aromatic vinyl compound, the vinyl cyanide compound and the maleimide-based compound are used in amounts of usually 50 to 96% by mass, 3 to 49% by mass and 1 to 47% by mass, respectively, and preferably 50 to 90% by mass, 5 to 45% by mass and 5 to 45% by mass, respectively, based on 100% by mass of a total amount of the aromatic vinyl compound, the vinyl cyanide compound and the maleimide-based compound.

In the above embodiments of the combinations (1) and (2), in the case where α-methyl styrene is used as the aromatic vinyl compound, the content of α-methyl styrene in the aromatic vinyl compound is usually 10 to 100% by mass and preferably 20 to 90% by mass. Meanwhile, in the above embodiments of the combinations (1) and (2), the other monomers may be further used in combination with the above compounds. Also, these compounds may be respectively used in combination with each other.

As described above, the component [A] may comprise the rubber-reinforced copolymer resin [A1] solely, or may be in the form of a mixture of the rubber-reinforced copolymer resin [A1] and the (co)polymer [A2] obtained by polymerizing the vinyl-based monomer [b2]. As the vinyl-based monomer [b2], there may be used at least one monomer selected from the group consisting of the vinyl-based monomers [b1] used for forming the rubber-reinforced copolymer resin [A1]. Therefore, the (co)polymer [A2] may be in the form of a polymer obtained by polymerizing, as the vinyl-based monomer [b2], a compound having the same composition as that of the vinyl-based monomers [b1], or may be in the form of a polymer obtained by polymerizing, as the vinyl-based monomer [b2], a monomer which is different in composition from the vinyl-based monomers [b1] but is of the same kind as that of the vinyl-based monomers [b1], or may be in the form of a polymer obtained by polymerizing, as the vinyl-based monomer [b2], a monomer which is different in both kind and composition from those of the vinyl-based monomers [b1]. Further, these polymers may be used in combination of any two or more thereof.

Thus, the (co)polymer [A2] may be in the form of either a homopolymer or a copolymer which is obtained by polymerizing the vinyl-based monomer [b2]. The (co)polymer [A2] is more specifically illustrated by the following preferred forms (3) to (9).

(3) One or more kinds of (co)polymers obtained by polymerizing an aromatic vinyl compound solely.

(4) One or more kinds of (co)polymers obtained by polymerizing a (meth)acrylic acid ester compound solely.

(5) One or more kinds of copolymers obtained by polymerizing an aromatic vinyl compound and a vinyl cyanide compound.

(6) One or more kinds of copolymers obtained by polymerizing an aromatic vinyl compound and a (meth)acrylic acid ester compound.

(7) One or more kinds of copolymers obtained by polymerizing an aromatic vinyl compound, a vinyl cyanide compound and a (meth)acrylic acid ester compound.

(8) One or more kinds of copolymers obtained by polymerizing an aromatic vinyl compound and a maleimide-based compound.

(9) One or more kinds of copolymers obtained by polymerizing an aromatic vinyl compound, a vinyl cyanide compound and a maleimide-based compound.

The polymers or copolymers of the above preferred forms (3) to (9) may be used in combination of any two or more thereof. Further, in the above preferred forms (3) to (9), in the case where α-methyl styrene is used as the aromatic vinyl compound, the content of α-methyl styrene in the aromatic vinyl compound is usually 10 to 100% by mass and preferably 20 to 90% by mass.

Meanwhile, as the above respective monomers, there may be used the compounds used for forming the rubber-reinforced copolymer resin [A1], and the preferred compounds are also the same as described above. In addition, in the case where the (co)polymer [A2] is in the form of a copolymer, the proportions of the respective monomers used therein are not particularly limited.

In consequence, specific examples of the (co)polymer [A2] include acrylonitrile-styrene copolymers, acrylonitrile-α-methyl styrene copolymers, acrylonitrile-styrene-α-methyl styrene copolymers, acrylonitrile-styrene-methyl methacrylate copolymers, styrene-methyl methacrylate copolymers, styrene-N-phenyl maleimide copolymers and acrylonitrile-styrene-N-phenyl maleimide copolymers.

In the present invention, in particular, in order to attain excellent chemical resistance and heat resistance of the resulting composition, in any of the case where the component [A] comprises the rubber-reinforced copolymer resin [A1] solely and the case where the component [A] comprises the rubber-reinforced copolymer resin [A1] and the (co)polymer [A2], the component [A] preferably comprises a structural unit derived from α-methyl styrene and/or a structural unit derived from a maleimide-based compound. The total amount of these structural units in the component [A] is usually 10 to 50% by mass, preferably 15 to 45% by mass and more preferably 20 to 40% by mass based on 100% by mass of the rubber-reinforced copolymer resin [A1]. When the total amount of these structural units lies within the above-specified range, the resulting composition can be enhanced in heat resistance and surface hardness and is excellent in mar resistance, and can exhibit a high chemical resistance because absorption of the solvent into the resin can be suppressed.

In consequence, in the case where the component [A] comprises the rubber-reinforced copolymer resin [A1] solely, the vinyl-based monomer [b1] preferably comprises at least one of α-methyl styrene or the maleimide-based compound. Also, in the case where the component [A] comprises the rubber-reinforced copolymer resin [A1] and the (co)polymer [A2], at least one of the vinyl-based monomers [b1] and [b2] preferably comprises at least one of α-methyl styrene or the maleimide-based compound.

The graft percentage of the rubber-reinforced copolymer resin [A1] is usually 10 to 200% by mass, preferably 15 to 150% by mass and more preferably 20 to 150% by mass. When the graft percentage of the rubber-reinforced copolymer resin [A1] is less than 10% by mass, the composition obtained according to the present invention tends to become insufficient in surface appearance and impact resistance. On the other hand, when the graft percentage of the rubber-reinforced copolymer resin [A1] is more than 200% by mass, the resulting composition tends to become insufficient in processability.

The graft percentage as used herein has the following definition. That is, when an amount of a rubber component contained in 1 g of the rubber-reinforced copolymer resin [A1] is represented by x grams; and an amount of an insoluble component obtained by dissolving 1 g of the rubber-reinforced copolymer resin [A1] in acetone (however, acetonitrile is used as the solvent in the case where the rubber polymer [a] is an acrylic rubber) is represented by y grams, the graft percentage is calculated from the following formula.

Graft percentage (% by mass)=$\{(y-x)/x\}\times 100$

The intrinsic viscosity [$\eta$] of an acetone-soluble component in the rubber-reinforced copolymer resin [A1] (an acetonitrile-soluble component in the case where the rubber polymer [a] is an acrylic rubber) (as measured at 30° C. in methyl ethyl ketone) is usually 0.1 to 1.0 dL/g, preferably 0.1 to 0.9 dL/g and more preferably 0.1 to 0.7 dL/g. When the intrinsic viscosity [$\eta$] of the acetone-soluble component lies within the above-specified range, the composition obtained according to the present invention is excellent in processability and impact resistance.

Meanwhile, the above graft percentage and intrinsic viscosity [$\eta$] may be readily controlled by appropriately varying kinds and amounts of a polymerization initiator, a chain transfer agent, an emulsifier and a solvent as well as polymerization time and polymerization temperature which are used upon production of the rubber-reinforced copolymer resin [A1].

Next, the processes for producing the rubber-reinforced copolymer resin [A1] and the (co)polymer [A2] are explained.

The rubber-reinforced copolymer resin [A1] can be produced by polymerizing the vinyl-based monomer [b1] in the presence of the rubber polymer [a]. As the polymerization method, there may be used, for example, emulsion polymerization, solution polymerization and bulk polymerization.

Meanwhile, when producing the rubber-reinforced copolymer resin [A1], the vinyl-based monomer [b1] may be added at one time or continuously to the reaction system in the presence of a whole amount of the rubber polymer [a]. Further, a whole amount or part of the rubber polymer [a] may be added in the course of the polymerization reaction.

In the case where 100 parts by mass of the rubber-reinforced copolymer resin [A1] are produced, the rubber polymer [a] is usually used in an amount of 5 to 80 parts by mass, preferably 10 to 70 parts by mass and more preferably 15 to 65 parts by mass. Further, in the above case, the vinyl-based monomer [b1] is usually used in an amount of 20 to 95 parts by mass, preferably 30 to 90 parts by mass and more preferably 35 to 85 parts by mass.

When the rubber-reinforced copolymer resin [A1] is produced by emulsion polymerization, there may be used a polymerization initiator, a chain transfer agent (molecular weight controller), an emulsifier, water, etc.

Examples of the polymerization initiator include redox-based initiators obtained by using an organic peroxide such as cumene hydroperoxide, diisopropyl benzene hydroperoxide and p-menthane hydroperoxide in combination with a reducing agent such as sugar-containing pyrophosphate compounds and sulfoxylate compounds; persulfates such as potassium persulfate; and peroxides such as benzoyl peroxide (BPO), lauroyl peroxide, tert-butyl peroxylaurate and tert-butyl peroxymonocarbonate. These polymerization initiators may be used in combination of any two or more thereof. Further, the above polymerization initiator may be added at one time or continuously to the reaction system. The polymerization initiator is usually used in an amount of 0.1 to 1.5% by mass and preferably 0.2 to 0.7% by mass based on a whole amount of the vinyl-based monomer [b1].

Examples of the chain transfer agent include mercaptans such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; terpinolenes; and dimers of $\alpha$-methyl styrene. These chain transfer agents may be used in combination of any two or more thereof. The chain transfer agent is usually used in an amount of 0.05 to 2.0% by mass based on a whole amount of the vinyl-based monomer [b1].

Examples of the emulsifier include anionic surfactants such as sulfuric acid esters of higher alcohols, alkylbenzenesulfonic acid salts such as sodium dodecylbenzenesulfonate, aliphatic sulfonic acid salts such as sodium laurylsulfate, higher aliphatic carboxylic acid salts and phosphoric acid-based compounds; and nonionic surfactants such as polyethylene glycol alkyl ester type compounds and polyethylene glycol alkyl ether type compounds. These emulsifiers may be used in combination of any two or more thereof. The emulsifier is usually used in an amount of 0.3 to 5.0% by mass based on a whole amount of the vinyl-based monomer [b1].

The latex obtained by the emulsion polymerization is usually treated with a coagulant to coagulate a polymer component thereof in the form of particles, and further the resulting particles are washed with water and then dried, thereby obtaining a purified polymer. Examples of the coagulant include inorganic salts such as calcium chloride, magnesium sulfate, magnesium chloride and sodium chloride; inorganic acids such as sulfuric acid and hydrochloric acid; and organic acids such as acetic acid and lactic acid.

Meanwhile, when using a plurality of the rubber-reinforced copolymer resins [A1] in combination with each other, the respective resins may be mixed with each other after production thereof. In an alternative method, latexes comprising the respective resins may be mixed with each other and then subjected to coagulation, etc., to prepare a mixture of the rubber-reinforced copolymer resins [A1].

As the methods of producing the rubber-reinforced copolymer resin [A1] by solution polymerization and bulk polymerization, there may be used conventionally known methods.

The (co) polymer [A2] may be produced by subjecting the vinyl-based monomer [b2] to solution polymerization, bulk polymerization, emulsion polymerization, suspension polymerization, etc., using the polymerization initiator applied to production of the rubber-reinforced copolymer resin [A1], or by subjecting the vinyl-based monomer [b2] to thermal polymerization using no polymerization initiator. These polymerization methods may be appropriately used in combination with each other.

The intrinsic viscosity [$\eta$] of the (co) polymer [A2] (as measured at 30° C. in methyl ethyl ketone) is usually 0.1 to 1.0 dL/g and preferably 0.15 to 0.7 dL/g. When the intrinsic viscosity [$\eta$] of the (co) polymer [A2] lies within the above-specified range, the composition obtained according to the present invention is excellent in balance between processability and impact resistance. Meanwhile, the intrinsic viscosity [$\eta$] of the (co) polymer [A2] may be controlled by adjusting production conditions thereof similarly to production of the rubber-reinforced copolymer resin [A1].

The intrinsic viscosity [$\eta$] of an acetone-soluble component in the component [A] (an acetonitrile-soluble component in the case where an acrylic rubber is used as the rubber polymer [a]) (as measured at 30° C. in methyl ethyl ketone) is usually 0.1 to 0.8 dL/g and preferably 0.15 to 0.7 dL/g. When the intrinsic viscosity [η] of the acetone-soluble component lies within the above-specified range, the composition obtained according to the present invention is excellent in balance between processability and impact resistance.

In any of the case where the component [A] comprises the rubber-reinforced copolymer resin [A1] solely and the case where the component [A] comprises the rubber-reinforced copolymer resin [A1] and the (co)polymer [A2], the content of the rubber polymer [a] in the above rubber-reinforced resin is usually 5 to 40% by mass, preferably 8 to 30% by mass and more preferably 10 to 25% by mass. When the content of the rubber polymer [a] lies within the above-specified range, the composition obtained according to the present invention is excellent in processability, impact resistance and heat resistance. When the content of the rubber polymer [a] is less than 5% by mass, the resulting composition tends to be insufficient in impact resistance. On the other hand, when the content of the rubber polymer [a] is more than 40% by mass, the resulting molded product tends to be insufficient in appearance, heat resistance and moldability.

(1-1) Polyester Resin [B]:

The polyester resin [B] used in the present invention is not particularly limited as long as it is a resin having an ester bond in a main chain of a molecule thereof. The polyester resin [B] may be in the form of either a saturated polyester resin or an unsaturated polyester resin. Among these polyester resins, preferred is a saturated polyester resin. Further, the polyester resin [B] may also be in the form of either a homopolyester or a copolyester, and further may also be in the form of either a crystalline resin or a non-crystalline resin.

As the polyester resin [B], there may be used, for example, those polyester resins obtained by polycondensation between a dicarboxylic acid component and a dihydroxy component, polycondensation of an oxycarboxylic acid component or a lactone component, etc.

Examples of the above dicarboxylic acid component include aromatic dicarboxylic acids having about 8 to 16 carbon atoms such as terephthalic acid, isophthalic acid, phthalic acid, naphthalenedicarboxylic acids (such as 2,6-naphthalenedicarboxylic acid), diphenyl dicarboxylic acid, diphenyl ether dicarboxylic acid, diphenyl methane dicarboxylic acid, diphenyl ethane dicarboxylic acid, diphenyl ketone dicarboxylic acid and 4,4'-diphenyl sulfone dicarboxylic acid, and derivatives thereof; alicyclic dicarboxylic acids having about 8 to 12 carbon atoms such as cyclohexanedicarboxylic acids (such as 1,2-cyclohexanedicarboxylic acid, 1,3-cyclohexanedicarboxylic acid and 1,4-cyclohexanedicarboxylic acid), hexahydrophthalic acid, hexahydroisophthalic acid, hexahydroterephthalic acid and himic acid, and derivatives thereof; and aliphatic dicarboxylic acids having about 2 to 40 carbon atoms such as adipic acid, pimelic acid, suberic acid, azelaic acid, sebacic acid, dodecanedicarboxylic acid, hexadecanedicarboxylic acid and dimer acids, and derivatives thereof. These dicarboxylic acids may be used in combination of any two or more thereof. Meanwhile, examples of the derivatives of the above dicarboxylic acids include ester-forming derivatives such as lower alkyl esters such as dimethyl esters, acid anhydrides, and acid halides such as acid chlorides.

Examples of the above dihydroxy component include aliphatic alkylene glycols, e.g., linear or branched alkylene glycols having about 2 to 12 carbon atoms such as ethylene glycol, 1,2-propanediol, 1,3-propanediol, 1,3-butanediol, 1,4-butanediol, 1,5-pentanediol, neopentyl glycol, 1,6-hexanediol, 1,8-octanediol and decanediol; alicyclic diols such as 1,2-cyclohexanediol, 1,4-cyclohexanediol, 1,1-cyclohexane dimethylol, 1,4-cyclohexane dimethylol and hydrogenated bisphenol A; aromatic diols such as hydroquinone, resorcin, dihydroxybiphenyl, naphthalenediol, dihydroxydiphenyl ether, bisphenol A, and adducts of bisphenol A with alkyleneoxides such as ethyleneoxide and propyleneoxide (such as diethoxylated bisphenol A); and polyoxyalkylene glycols such as diethylene glycol, triethylene glycol, polyoxyethylene glycol, ditetramethylene glycol, polytetramethylene glycol, dipropylene glycol, tripropylene glycol, polyoxypropylene glycol and polytetramethylene ether glycol. These dihydroxy components may be used in combination of any two or more thereof. Meanwhile, the above dihydroxy component may also have a substituent group such as, for example, an alkyl group, an alkoxy group and a halogen group.

Examples of the above oxycarboxylic acid component include oxycarboxylic acids such as oxybenzoic acid, oxynaphthoic acid and diphenylene-oxycarboxylic acid, and derivatives thereof. These oxycarboxylic acid components may be used in combination of any two or more thereof.

Examples of the lactone component include propiolactone, butyrolactone, valerolactone and ε-caprolactone. These lactone components may be used in combination of any two or more thereof.

Specific examples of the homopolyester as the polyester resin [B] include polyalkylene terephthalates such as polyethylene terephthalate (PET), polypropylene terephthalate (PPT), polybutylene terephthalate (PBT), polyhexamethylene terephthalate, polycyclohexane-1,4-dimethyl terephthalate and polyneopentyl terephthalate; polyethylene isophthalate; and polyalkylene naphthalates such as polyethylene naphthalate, polybutylene naphthalate and polyhexamethylene naphthalate. These homopolyesters may be used in combination of any two or more thereof. Among these homopolyesters, especially preferred is polybutylene terephthalate (PBT).

Examples of the dicarboxylic acid component generally used for producing the copolyester as the polyester resin [B] include aromatic dicarboxylic acids such as terephthalic acid and isophthalic acid; and aliphatic dicarboxylic acids such as adipic acid, pimelic acid, suberic acid, azelaic acid and sebacic acid. Examples of the dihydroxy component used for producing the copolyester include aliphatic alkylene glycols, e.g., linear alkylene glycols such as ethylene glycol, propylene glycol and 1,4-butanediol; and polyoxyalkylene glycols having poly(oxyalkylene) units in which the number of the repeating oxyalkylene units is about 2 to 4, such as diethylene glycol and polytetramethylene glycol.

Further, in addition to the above respective compounds, as the components which may be polycondensed therewith, there may be used, if required, one or more components selected from monofunctional components such as hydroxycarboxylic acids or alkoxycarboxylic acids such as glycolic acid, m-hydroxybenzoic acid, p-hydroxybenzoic acid, 6-hydroxy-2-naphthalenecarboxylic acid and p-β-hydroxyethoxybenzoic acid, stearyl alcohol, benzyl alcohol, stearic acid, benzoic acid, tert-butyl benzoic acid and benzoyl benzoic acid, and ester derivatives thereof; polycarboxylic acids such as triballylic acid, trimellitic acid, trimesic acid and pyromellitic acid; polyhydric alcohols such as glycerin, trimethylol ethane, trimethylol propane, glycerol and pentaerythritol; and tri- or higher polyfunctional components such as gallic acid, and ester derivatives thereof.

The preferred copolyesters used in the present invention are polymers obtained by polycondensing a dicarboxylic acid component mainly including terephthalic acid and/or a derivative thereof (such as lower alkyl esters such as dimethyl esters, acid anhydrides, and acid halides such as acid chlorides) with a dihydroxy component including 1,4-butanediol, etc. Examples of the copolyesters include copolymer-type polybutylene terephthalates whose glass transition temperature lies within the range of 0 to 75° C.; and copolymer-type polyethylene terephthalates which are produced by polycondensing a dicarboxylic acid component mainly including terephthalic acid and/or a derivative thereof (such as lower alkyl esters such as dimethyl esters, acid anhydrides, and acid halides such as acid chlorides) with a dihydroxy component including ethylene glycol, etc. Among these copolyesters, especially preferred are copolymer-type polybutylene terephthalates. Meanwhile, it is known that the copolymer-type polybutylene terephthalates are substantially flexible as compared to polybutylene terephthalate (PBT), and therefore the copolymer-type polybutylene terephthalates are also called "soft PBT".

The above copolymer-type polybutylene terephthalates are in the form of a polymer comprising a butylene terephthalate unit which is obtained by polycondensing 1,4-butanediol with terephthalic acid or a derivative thereof, and may also be in the form of a copolymer obtained by substituting a part of each of terephthalic acid and 1,4-butanediol with the other monomer component copolymerizable therewith. Examples of the acid component as the other copolymerizable monomer component include dicarboxylic acids such as isophthalic acid, naphthalenedicarboxylic acid, 4,4'-diphenoxyethanedicarboxylic acid, adipic acid, sebacic acid and cyclohexanedicarboxylic acid. Examples of the glycol component as the other copolymerizable monomer component include ethylene glycol, trimethylene glycol, hexamethylene glycol, polyethylene glycol, polypropylene glycol, polytetramethylene glycol and a copolyglycol of polyethylene glycol and polypropylene glycol. However, the proportion of monomer units constituted from the other copolymerizable monomer component is preferably less than 30 mol % based on a whole amount of the polymer.

The polybutylene terephthalates used in the present invention preferably have an intrinsic viscosity of 0.5 to 1.3 dL/g and more preferably 0.6 to 0.8 dL/g as measured at 30° C. in a mixed solvent comprising phenol and tetrachloroethane at a mixing mass ratio of 1/1.

The method of producing the polyester resin [B] is not particularly limited, and any known methods may be adopted therefor. For example, as the method of producing a polybutylene terephthalate-based resin, there may be used the method in which a dicarboxylic acid component comprising terephthalic acid and/or an ester derivative thereof as a main component and a diol component comprising 1,4-butanediol as a main component are subjected to esterification reaction in the presence of an esterification reaction catalyst at a temperature of usually 150 to 280° C. and preferably 180 to 265° C. under a pressure of usually 50 to 1000 Torr (6666 to 133322 Pa) and preferably 70 to 760 Torr (9333 to 101325 Pa) in a single esterification reaction vessel or a plurality of esterification reaction vessels for 2 to 5 hr while stirring, and the resulting esterification reaction product (oligomer) is transferred into a single polycondensation reaction vessel or a plurality of polycondensation reaction vessels in which the reaction product was subjected to polycondensation reaction in the presence of a polycondensation reaction catalyst at a temperature of usually 210 to 280° C. and preferably 220 to 265° C. under a pressure of usually not more than 200 Torr (26664 Pa) and preferably not more than 150 Torr (19998 Pa) for 2 to 5 hr while stirring. The reaction method may be either a continuous method, a semi-continuous method or a batch method.

In addition, the resin obtained by the polycondensation reaction is usually withdrawn from a bottom of the polycondensation reaction vessel, delivered to a die, and extruded from the die into a strand shape. While cooling with water or after the water-cooling, the strands are cut into granules such as pellets and chips.

Examples of the above esterification reaction catalyst include titanium compounds, tin compounds, magnesium compounds, calcium compounds and zirconium compounds. Among these compounds, preferred are titanium compounds. Specific examples of the titanium compounds include titanium alcoholates such as tetramethyl titanate, tetraisopropyl titanate and tetrabutyl titanate; and titanium phenolates such as tetraphenyl titanate. The amount of the esterification reaction catalyst used may be controlled as follows. For example, tetrabutyl titanate is used in an amount of usually 30 to 300 ppm and preferably 50 to 200 ppm in terms of a titanium atom based on a theoretical yield of the polybutylene terephthalate-based resin.

As the polycondensation reaction catalyst, the esterification reaction catalyst added upon the above esterification reaction may be continuously used as such, and the polycondensation reaction may be carried out without adding any additional catalyst thereto. However, an additional amount of the same catalyst as used as the esterification reaction catalyst upon the esterification reaction may be added to the polycondensation reaction system. In this case, the amount of the catalyst added may be controlled as follows. That is, for example, tetrabutyl titanate is added in an amount of usually not more than 300 ppm and preferably not more than 150 ppm in terms of a titanium atom based on a theoretical amount of the polybutylene terephthalate-based resin. In addition, as the polycondensation reaction catalyst, there may be fleshly added a catalyst which is different from the esterification reaction catalyst such as, for example, an antimony compound such as diantimony trioxide and a germanium compound such as germanium dioxide and germanium tetraoxide.

In the esterification reaction and/or the polycondensation reaction, in addition to the above-mentioned catalysts, there may also be used the other additives including reaction assistants, e.g., phosphorus compounds such as orthophosphoric acid, phosphorous acid, hypophosphorous acid, polyphosphoric acid and esters or metal salts thereof, and alkali metal or alkali earth metal compounds such as sodium hydroxide, sodium benzoate, magnesium acetate and calcium acetate; antioxidants, e.g., phenol compounds such as 2,6-di-tert-butyl-4-octyl phenol and pentaerythrityl-tetrakis[3-(3',5'-tert-butyl-4'-hydroxyphenyl)propionate], thioether compounds such as dilauryl-3,3'-thiodipropionate and pentaerythrityl-tetrakis(3-lauryl thiodipropionate), and phosphorus compounds such as triphenyl phosphite, tris(nonylphenyl)phosphite and tris(2,4-di-tert-butylphenyl)phosphite; and release agents such as paraffin waxes, microcrystalline waxes, polyethylene waxes, long-chain fatty acids and ester thereof such as typically montanic acid and montanic acid esters, and silicone oils.

As the esterification reaction vessel, there may be used any type reaction vessel such as, for example, a vertical type stirring complete mixing vessel, a vertical type thermal convection mixing vessel and a tower type continuous reaction vessel. Also, the esterification reaction vessel may be in the form of a single reaction vessel or a plurality of reaction vessels of the same type or different type which are connected in series with each other. In addition, as the polycondensation reaction vessel, there may also be used any type reaction vessel such as, for example, a vertical type stirring polymerization vessel, a horizontal type stirring polymerization vessel and a thin-film evaporation type polymerization reaction vessel. Also, the polycondensation reaction vessel may be in the form of a single reaction vessel or a plurality of reaction vessels of the same type or different type which are connected in series with each other.

(1-3) Ethylene-(meth)acrylic acid ester-carbon monoxide copolymer [C]:

The ethylene-(meth)acrylic acid ester-carbon monoxide copolymer [C] used in the present invention is a copolymer comprising an ethylene unit (hereinafter referred to as a unit [t1]), a unit comprising a (meth)acrylic acid ester (hereinafter referred to as a unit [t2]) and a unit comprising carbon monoxide (hereinafter referred to as a unit [t3]).

The content of the unit [t1] is usually 30 to 90% by mass and preferably 40 to 80% by mass based on 100% by mass of the component [C]. The content of the unit [t2] is usually 5 to 60% by mass and preferably 20 to 50% by mass based on 100% by mass of the component [C]. In addition, the content of the unit [t3] is usually 1 to 40% by mass and preferably 5 to 30% by mass based on 100% by mass of the component [C].

Meanwhile, the alkyl group contained in the (meth)acrylic acid ester forming the unit [t2] may be either linear or branched and has 1 to 18 carbon atoms. Specific examples of the alkyl group in the (meth)acrylic acid ester forming the unit [t2] include a methyl group, an ethyl group, an n-propyl group, an isopropyl group, an n-butyl group, a sec-butyl group, a t-butyl group, an isobutyl group, a hexyl group, a 2-ethylhexyl group and an octyl group. Among these compounds, preferred are those compounds having 1 to 8 carbon atoms. These compounds may be used in combination of any two or more thereof. Among these compounds, especially preferred are methyl methacrylate and n-butyl acrylate.

The above ethylene-(meth)acrylic acid ester-carbon monoxide copolymer [C] may be produced by the methods described in Japanese Patent Application Laid-Open (KO-KAI) No. 9-87484, Japanese Patent No. 2884180, etc.

More specifically, among ethylene, an acrylic acid ester and carbon monoxide used as raw monomers, the carbon monoxide and acrylic acid ester are first fed under pressure in a reactor into an ethylene supply system, and then the resulting mixed monomers are fed together or separately under pressure in the reactor and introduced into the reactor to thereby produce the copolymer as aimed. The reactor used above is preferably capable of withstanding a high pressure and a high temperature, and equipped with a stirrer driven by a high speed motor, a pressure relief valve and a jacketed wall surface for circulating a heating or cooling fluid for temperature control. Upon feeding the monomers, a radical polymerization catalyst (such as peroxides, peresters, azo compounds and percarbonates) may also be fed under pressure into the reactor through the other feed line, if required. Thereafter, a mixture of the copolymer and monomers is discharged from the rector and flowed toward a separator while reducing a pressure of the mixture. The monomers discharged from the separator may be decomposed, or otherwise may be mixed with raw monomers for preparation of the copolymer and circulated again under pressure into the reactor. The molten copolymer thus produced is withdrawn from the separator and cut into an adequate size. In this case, the temperature of the reactor is usually not lower than 140° C., preferably 155 to 300° C. and more preferably 155 to 225° C. Also, the pressure of the reactor is usually $3.45 \times 10^7$ to $4.14 \times 10^8$ Pa and preferably $1.38 \times 10^8$ to $2.41 \times 10^8$ Pa.

The MFR of the component [C] (as measured at 200° C. under a load of 19.6 N according to JIS K7210) is usually 1 to 500 g/10 min, preferably 1 to 150 g/10 min, more preferably 3 to 130 g/10 min and especially preferably 5 to 50 g/10 min. When using the component [C] whose MFR lies within the above-specified range, it is possible to enhance a chemical resistance of the resulting composition and suppress occurrence of defective phenomena such as delamination.

Further, the component [C] is preferably uniformly dispersed in the composition of the present invention. The particle diameter of the component [C] is usually 0.001 to 10 μm and preferably 0.01 to 5 μm. When the particle diameter of the dispersed particles of the component [C] is less than 0.001 μm, the resulting composition tends to be deteriorated in mechanical strength. On the other hand, when the particle diameter of the dispersed particles of the component [C] is more than 10 μm, the resulting molded product tends to be insufficient in appearance (gloss).

As the component [C], there may be used commercially available products. Examples of the commercially available products of the component [C] include "ELVALOY HP4051" and "ELVALOY HP771" both produced by DuPont-Mitsui Polychemicals Co., Ltd., etc.

(1-4) Additives:

The resin composition for coating according to the present invention may further appropriately comprise various additives such as a flame retardant, a filler, a colorant, a metal powder, a reinforcing agent, a plasticizer, a compatibilizing agent, a heat stabilizer, a light stabilizer, an antioxidant, an ultraviolet absorber, an antistatic agent, a lubricant, a weather resistance, an anti-aging agent, an anti-fogging agent, an anti-fungus agent, a mildew-proof agent, a tackifier and a plasticizer, unless they have adverse influence on the objects and effects of the present invention. Examples of the colorant include organic pigments, organic dyes and inorganic pigments.

Examples of the flame retardant include phosphoric acid compounds, for example, ammonium polyphosphate, triethyl phosphate and tricresyl phosphate. The flame retardant is usually added in an amount of 1 to 20% by mass based on 100% by mass of the thermoplastic resin composition.

Examples of the filler include glass fibers, carbon fibers, wollastonite, talc, mica, kaolin, glass beads, glass flakes, milled fibers, zinc oxide whiskers and potassium titanate whiskers. The filler is usually added in an amount of 1 to 50% by mass based on 100% by mass of the thermoplastic resin composition.

In addition, the resin composition for coating according to the present invention may also comprise the other resins such as, for example, polyethylene, polypropylene, polycarbonates, polyphenylene sulfides and polyamides, if required, unless they have adverse influence on the objects and effects of the present invention.

[2] Method for Producing Resin Composition for Coating:

In the resin composition for coating according to the present invention, the amounts of the component [A], the component [B] and the component [C] compounded ([A]/[B]/[C]) are 84.9 to 98.9/1 to 8/0.1 to 7.1 parts by mass, preferably 87 to 97/2 to 7/1 to 6 parts by mass, more preferably 89 to 95/3 to 6/2 to 5 parts by mass, and especially preferably 91 to 95/3 to 5/2 to 4 parts by mass based on 100 parts by mass of a total amount of the components [A], [B] and [C].

When the content of the component [B] is less than 1 part by mass, the composition obtained according to the present invention tends to be insufficient in chemical resistance, so that coating defect (foaming) tends to occur owing to absorption of an organic solvent such as a thinner therein. On the other hand, when the content of the component [B] is more than 8 parts by mass, the composition obtained according to the present invention tends to be deteriorated in compatibility, so that peeling tends to readily occur, and further the obtained molded product tends to be deteriorated in coating appearance owing to high repellence against a coating material. Also, when the content of the component [C] is less than 0.1 part by mass, the compatibility between the components [A] and [B] tends to be lowered, so that the composition obtained according to the present invention tends to be insufficient in chemical resistance, and there tend to occur problems such as coating defect (foaming) and deterioration in coating appearance of the resulting molded product. On the other hand, when the content of the component [C] is more than 7.1 part by mass, the compatibility between the components [A] and [B] tends to be lowered, so that peeling tends to occur, and the resulting molded product also tends to be deteriorated in coating appearance.

The resin composition for coating according to the present invention may be prepared by kneading raw material components using various extruders, a Banbury mixer, a kneader, rolls, a feeder ruder, etc., and may be formed into pellets having a desired shape. The kneading temperature may be determined depending upon kinds and amounts of the respective raw material components, etc., and is usually 180 to 300° C. and preferably 200 to 280° C. The method of using the raw material components is not particularly limited, and the respective raw material components may be compounded and kneaded at one time, or intermittently compounded and kneaded in divided parts in multiple stages.

[3] Molded Product:

The resin composition for coating according to the present invention may be formed into a molded product having a desired shape by known molding methods such as an injection-molding method, an injection compression-molding method, a press-molding method, an extrusion-molding method, a co-extrusion-molding method, a sheet extrusion-molding method, a profile extrusion-molding method, an expansion-molding method, a vacuum forming method, a blow-molding method, a compression-molding method, a cast-molding method and a roll-molding method.

The coating method of the molded product according to the present invention is not particularly limited. Examples of the coating method include conventionally known coating methods such as an electrostatic coating method, a powder coating method, an electro-deposition method, an air spray coating method and an airless spray coating method. Examples of the coating materials used for the above coating methods include acrylic resin coating materials, phenol resin coating materials, alkyd resin coating materials, amino-alkyd resin coating materials, vinyl chloride resin coating materials, silicone resin coating materials, fluororesin coating materials, unsaturated resin coating materials, epoxy resin coating materials, polyurethane resin coating materials, melamine resin coating materials, oil coating materials, powder coating materials, enamel-based coating materials, water-soluble coating materials, epoxy resin coating materials, acryl-urethane resin-based coating materials, acryl-melamine resin-based coating materials and polyester-melamine resin-based coating materials. Among these coating materials, preferred are enamel-based coating materials, acrylic resin coating materials, urethane resin coating materials and melamine resin coating materials.

As an index representing an adhesion strength of the coating, there may be used a peel strength. In the present invention, the 180° peel strength of a coating film as measured by forming cuts thereon at intervals of 10 mm in width is usually not less than 0.3 kg/cm, preferably not less than 0.5 kg/cm, more preferably not less than 0.9 kg/cm, still more preferably not less than 1.0 kg/cm and most preferably not less than 1.5 kg/cm. The upper limit of the peel strength of the coating film is not particularly limited, and is usually not more than 20.0 kg/cm and preferably not more than 10.0 kg/cm.

The resin composition for coating according to the present invention has a good surface impact strength even after subjected to a series of coating treatments including thermal treatments. For example, when subjecting a test piece obtained from the composition to a high-speed surface impact test conducted under the conditions including a temperature of 23° C., a punch tip diameter of ⅝ inch and an impact velocity of 2.5 m/s, the impact energy obtained therein is usually not less than 20 J, preferably not less than 30 J, more preferably not less than 35 J, still more preferably not less than 45 J and most preferably not less than 50 J. The upper limit of the impact energy is not particularly limited, and is usually not more than 150 J.

In addition, when subjecting the same coated test piece as used above to a high-speed surface impact test conducted under the conditions including a temperature of −30° C., a punch tip diameter of ⅝ inch and an impact velocity of 2.5 m/s, the impact energy obtained therein is usually not less than 5 J, preferably not less than 10 J, more preferably not less than 15 J, still more preferably not less than 20 J and most preferably not less than 30 J. The upper limit of the impact energy is not particularly limited, and is usually not more than 100 J.

The above surface hardness is the value of a pencil hardness as measured under a load of 1 kg according to JIS-K-5400.

In addition, when a surface of a coated test piece obtained by subjecting an injection-molded test piece having a size of 80 mm×80 mm×3 mm in thickness to coating treatment is cut to provide 100 cross-cuts (10×10) each having a size of 1 mm square on a coating film thereof and then subjected to Cellophane tape peel test by a cross-cut tape method according to JIS K 5400-1990, the number of remaining cross-cuts on the coating film is usually not less than 70, preferably not less than 80, more preferably not less than 90, still more preferably not less than 95 and most preferably not less than 100.

The resin composition for coating according to the present invention is excellent in balance between coatability, impact resistance, moldability and chemical resistance. When using the composition for a large size coated molded product, it is possible to attain a good coating appearance thereof. Therefore, the composition of the present invention can be extensively used in various applications such as vehicles, domestic appliances and building materials. In particular, the composition of the present invention can be suitably used in the application field of vehicles for large parts to be coated such as front grilles, wheel caps, bumpers, fenders, spoilers and garnishes.

EXAMPLES

The present invention is described in more detail by the following examples, but these examples are only illustrative and not intended to limit a scope of the present invention thereto. Meanwhile, in the following examples, etc., the "part(s)" and "%" represent "part(s) by mass" and "% by mass", respectively, unless otherwise specified. Also, the evaluation methods used in the following Examples, etc., are as follows.

(1) Evaluation Methods:

(1-1) Charpy Impact Strength (C-IMP):

According to ISO testing method 179, the Charpy impact strength (Edgewise Impact; notched) was measured at room temperature. The measuring conditions were as follows.

Type of test piece: Type 1
Type of notch: Type A
Load: 2 J (1-2) Melt Mass Flow Rate (MFR):

According to ISO testing method 1133, the melt mass flow rate was measured at a temperature of 240° C. under a load of 98 N.

(1-3) Heat Deflection Temperature (HDT):

According to ISO testing method 75, the heat deflection temperature was measured under a load of 1.80 MPa.

(1-4) Coating Defect (Foaming):

Using an injection molding machine "α-150" (model name) manufactured by FANUC Corp., the resin composition for coating as shown in Table 1 was injection-molded into a test piece having a size of 150 mm×70 mm×3 mm. The resin temperature upon the injection molding was 260° C., the mold temperature was 5° C., and the injection speed was 5 mm/s. The thus obtained test piece was coated according to the following procedures (i) to (vi) to determine whether or not any coating defect occurred.

<(i) Conditioning>

The injection-molded test piece was allowed to stand in a constant temperature bath controlled at 0° C. for a period of 12 hr or longer to conduct conditioning thereof.

<(ii) Base Coating>

A coating material for base coating comprising 53 parts of a synthetic resin enamel coating material and 47 parts of a thinner for the synthetic resin coating material (total amount of both the components: 100 parts) was prepared, and spray-coated on the test piece to form a coating film having a thickness of 20 to 30 μm.

<(iii) Standing for 1 min>

The test piece obtained in the above (ii) was allowed to stand for 1 min.

<(iv) Clear Coating>

A coating material for clear coating comprising 56 parts of a synthetic resin clear coating material, 22 parts of a thinner for the synthetic resin coating material and 22 parts of a curing agent (total amount of these components: 100 parts) was prepared, and spray-coated on the test piece to form a coating film having a thickness of 30 to 40 μm.

<(v) Standing for 10 min>

The test piece obtained after subjected to the clear coating was allowed to stand for 10 min.

<(vi) Drying>

The test piece obtained after the above (v) was dried at 80° C. for 30 min.

The surface of the test piece obtained after the drying was observed to determine whether or not coating defect (foaming) occurred, and the observation results were evaluated according to the following ratings.

<Evaluation of Coating Defect (Foaming)>

A: No foaming defect occurred on a surface of the test piece.

B: One to ten foaming defects occurred on a surface of the test piece.

C: Eleven or more foaming defects occurred on a surface of the test piece.

(1-5) Coating Appearance:

The test piece prepared for the above evaluation of coating defect (foaming) was observed to determine whether or not any coating defects other than foaming occurred, and the observations results were evaluated according to the following ratings.

<Evaluation Ratings of Coating Defects (Other Than Foaming)>

A: No coating defects occurred over a whole portion of the test piece with a beautiful coating appearance.

B: Coating defects occurred on a part of the test piece.

C: Coating defects occurred over a whole portion of the test piece with failure to attain a beautiful coating appearance.

(1-6) Peel Test:

Using an injection molding machine "α-150" (model name) manufactured by FANUC Corp., the resin composition for coating as shown in Table 1 was injection-molded into a test piece. The resin temperature upon the injection molding was 260° C., the mold temperature was 50° C., and the injection speed was 5 mm/s.

Figure 1B:
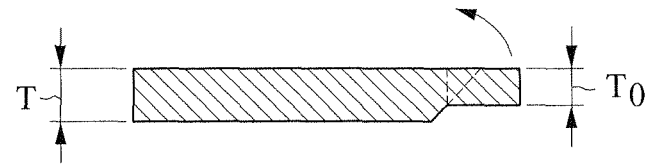
FIG. 1(b) is a sectional view of the test piece taken along the line A-A in FIG. 1(a).

FIG. 1(a) is a bottom view of the above test piece, and FIG. 1(b) a sectional view of the test piece taken along the line A-A in FIG. 1(a). The dimensions shown in FIG. 1(a) and FIG. 1(a) are as follows: That is, L=150 mm; W=70 mm; T=3 mm; L1=45 mm; L0=6 mm; W1=3 mm; T0=2 mm The peel test was carried out as follows. That is, notches (each having a length of 2 mm) were formed at two positions of the test piece (1) on left and right sides of a gate (2) thereof. The gate (2) was clamped with cutting pliers and pulled in the direction shown by an arrow in FIG. 1(b) to observe whether or not any peeling occurred on a surface of the test piece (1). The observation results are evaluated according to the following ratings.

<Evaluation Ratings of Peeling>

A: No peeling occurred in the vicinity of the gate.

B: Peeling occurred from the gate toward the molded product, and a length of the peeling as measured from the gate was not more than 5 mm.

C: Peeling occurred from the gate toward the molded product, and a length of the peeling as measured from the gate was more than 5 mm.

(2) Raw Material Components of Resin Composition for Coating:

(2-1) Component [A]:

(2-1-1) Production of rubber-reinforced copolymer resin (A1-1):

A flask was charged with 54 parts (in terms of a solid content) of a polybutadiene rubber latex (average particle diameter: 270 nm) and 6 parts (in terms of a solid content) of a styrene-butadiene-based copolymer rubber latex (styrene content: 25%; average particle diameter: 550 nm) and further charged with 150 parts of ion-exchanged water, 7 parts of styrene, 3 parts of acrylonitrile and 0.2 part of t-dodecyl mercaptan. Then, the contents of the flask were heated to 60° C., and a solution prepared by dissolving 0.2 part of sodium pyrophosphate, 0.01 part of ferrous sulfate heptahydrate and 0.4 part of glucose in 20 parts of ion-exchanged water was added into the flask. Further, 0.1 part of cumene hydroperoxide was added into the flask to initiate polymerization of the contents of the flask, and the temperature of a warm bath was maintained at 70° C. After polymerizing the contents of the flask for 1 hr, 22 parts of styrene, 8 parts of acrylonitrile, 0.5 part of t-dodecyl mercaptan and 0.2 part of cumene hydroperoxide were continuously added into the flask over 2 hr, and the contents of the flask were further polymerized to complete the reaction thereof for one hour. The resulting copolymer latex was solidified by adding sulfuric acid thereto, and washed with water and then dried to thereby obtain a resin composition in the form of a powder. As a result, it was confirmed that the thus obtained resin composition had a graft percentage of 33%, and an acetone-soluble component thereof had an intrinsic viscosity [η] of 0.21 dL/g (as measured at 30° C. in MEK solution).

(2-1-2) Production of Copolymer Resin (A2-1):

A polymerization vessel equipped with a stirrer was charged with 250 parts of water and 1.0 part of sodium palmitate, and the contents of the polymerization vessel were deoxidized and then heated to 70° C. while stirring in a nitrogen atmosphere. Further, 0.4 part of sodium formaldehyde sulfoxylate, 0.0025 part of ferrous sulfate and 0.01 part of disodium ethylenediamine tetraacetate were charged into the polymerization vessel, and then a monomer mixture comprising 70 parts of α-methyl styrene, 25 parts of acrylonitrile, 5 parts of styrene, 0.5 part of t-dodecyl mercaptan and 0.2 part of cumene hydroperoxide was continuously added dropwise into the polymerization vessel at a polymerization temperature of 70° C. over 7 hr. After completion of the dropping, the polymerization temperature was raised to 75° C., and the contents of the polymerization vessel were continuously stirred for 1 hr to terminate the polymerization reaction, thereby obtaining a copolymer latex. The conversion rate of the polymerization reaction was 99%. Thereafter, the resulting latex was solidified by adding calcium chloride thereto, and washed, filtered and then dried to thereby obtain a copolymer in the form of a powder. As a result, it was confirmed that an acetone-soluble component of the thus obtained copolymer had a intrinsic viscosity [η] of 0.40 dL/g.

(2-1-3) Copolymer Resin (A2-2):

"DENKA IP MX037" (tradename) produced by Denki Kagaku Kogyo K.K. (N-phenyl maleimide-acrylonitrile-styrene copolymer; N-phenyl maleimide unit content: 38.5%)

(2-1-4) Production of Copolymer Resin (A2-3):

A 20 L-capacity stainless steel autoclave equipped with a ribbon-type agitation blade, a continuous assistant feeder, a thermometer, etc., was charged with 63 parts by mass of styrene, 37 parts by mass of acrylonitrile, 0.5 part by mass of t-dodecyl mercaptan, 40 parts by mass of toluene, and 0.05 part by mass of dicumyl peroxide, and the contents of the autoclave were heated until an inside temperature of the autoclave reached 145° C. while stirring at a stirring rotational speed of 100 rpm. The polymerization of the contents of the autoclave was initiated at the time at which the inside temperature of the autoclave reached 110° C., and thereafter the polymerization reaction was continued for 3.5 hr. Meanwhile, after the inside temperature of the autoclave reached 145° C., the inside temperature was maintained at 145° C., and the contents of the autoclave were stirred at a stirring rotational speed of 100 rpm. After completion of conducting the above 3.5-hr polymerization reaction, the contents of the autoclave were cooled until the inside temperature of the autoclave was dropped to 100° C. The resulting reaction mixture was withdrawn from the autoclave and subjected to steam distillation to remove the unreacted materials and solvent therefrom. Further, the reaction mixture was subjected to devolatilization treatment using a 40 mmφ vented extruder (cylinder temperature: 220° C.; vacuum degree: 760 mmHg) to remove substantially all volatile components therefrom, and then pelletized. The polymerization conversion rate upon completion of the polymerization reaction was 82%. As a result, it was confirmed that the resulting styrene-acrylonitrile copolymer had an intrinsic viscosity [η] of 0.42 dL/g (as measured at 30° C. in methyl ethyl ketone), a weight-average molecular weight of 80,000 and an acrylonitrile unit content of 32% by mass.

(2-2) Component [B]:

(2-2-1) Polyester resin (B-1):

"DURANEX 200FP" (tradename; PBT) produced by WinTech Polymer Ltd.

(2-3) Component [C]:

(2-3-1) Ethylene-(meth)acrylic Acid Ester-Carbon Monoxide copolymer (C-1):

There was used an ethylene-(meth)acrylic acid ester-carbon monoxide copolymer "ELVALOY HP-4051" (tradename) produced by DuPont-Mitsui Polychemicals Co., Ltd. The MFR of the above copolymer as measured at 200° C. under a load of 19.6 N according to JIS K7210 was 12 g/10 min.

(2-3-2) Ethylene-(meth)acrylic acid ester-carbon monoxide copolymer (C-2):

There was used an ethylene-(meth)acrylic acid ester-carbon monoxide copolymer "ELVALOY HP-771" (tradename) produced by DuPont-Mitsui Polychemicals Co., Ltd. The MFR of the above copolymer as measured at 200° C. under a load of 19.6 N according to JIS K7210 was 100 g/10 min.

(2-4) Additives:

(2-4-1) Lubricant (D-1):

There was used ethylene bis(stearic amide) "KAOWAX EB-P" (tradename) produced by Kao Corp.

(2-4-2) Antioxidant (D-2):

There was used 3-(3',5'-di-tert-butyl-4'-hydroxyphenyl)-N-octadecyl propionate "ADEKASTUB A0-50" (tradename) produced by ADEKA Corp.

(2-4-3) Antioxidant (D-3):

There was used bis(2,6-di-tert-butyl-4-methylphenyl)pentaerythritol diphosphite "ADEKASTUB PEP-36" (tradename) produced by ADEKA Corp.

Examples 1 to 9 and Comparative Example 1 to 5

The above components [A] to [D] were mixed with each other at the compounding ratios as shown in Table 1 using a Henschel mixer, and then kneaded using a twin-screw extruder "TEX44" (barrel set temperature: 240° C.) manufactured by The Japan Steel Works, Ltd., to thereby form the resulting resin composition for coating into pellets. The thus obtained pellets were molded to prepare respective test pieces for evaluation. The thus prepared test pieces were subjected to the above evaluation procedures. The evaluation results are shown in Tables 1 and 2.

Example 10

The resin composition for coating prepared in Example 1 was injection-molded to produce a spoiler for vehicles having a size of 1200 mm×150 mm and an average wall thickness of 3 mm. When the thus obtained spoiler was subjected to coating treatment, it was possible to obtain a coated spoiler for vehicles which was free from coating defects and had a beautiful appearance.

Comparative Example 6

The resin composition for coating prepared in Comparative Example 1 was injection-molded to produce a spoiler for vehicles having a size of 1200 mm×150 mm and an average wall thickness of 3 mm. When the thus obtained spoiler was subjected to coating treatment, the resulting coated product suffered from occurrence of foaming, so that it was not possible to obtain a spoiler for vehicles having a beautiful appearance.

Example 11

The resin composition for coating prepared in Example 1 was injection-molded to produce a rear garnish for vehicles having a size of 500 mm×200 mm and an average wall thickness of 3 mm. When the thus obtained rear garnish was subjected to coating treatment, it was possible to obtain a coated rear garnish for vehicles which was free from coating defects and had a beautiful appearance.

Comparative Example 7

The resin composition for coating prepared in Comparative Example 1 was injection-molded to produce a rear garnish for vehicles having a size of 500 mm x 200 mm and an average wall thickness of 3 mm. When the thus obtained rear garnish was subjected to coating treatment, the resulting coated product suffered from occurrence of foaming, so that it was not possible to obtain a rear garnish for vehicles having a beautiful appearance.

TABLE 1

| Formulation | Examples | | | | |
|---|---|---|---|---|---|
| | 1 | 2 | 3 | 4 | 5 |
| Rubber-reinforced vinyl-based resin [A] (part) | | | | | |
| A1-1: ABS | 24.0 | 24.0 | 24.0 | 24.0 | 24.0 |
| A2-1: AMS-based copolymer | 44.0 | 44.0 | 44.0 | 44.0 | 0.0 |
| A2-2: Maleimide-based copolymer | 0.0 | 0.0 | 0.0 | 0.0 | 0.0 |
| A2-3: AS | 24.5 | 22.5 | 19.5 | 26.7 | 68.5 |
| Polyester resin [B] (part) | | | | | |
| B-1: PBT | 4.5 | 4.5 | 4.5 | 2.3 | 4.5 |
| Content of α-methyl styrene unit in [A] (mass %) | 33.3 | 3.40 | 35.2 | 32.5 | 0.0 |
| Content of maleimide compound unit in [A] (mass %) | 0.0 | 0.0 | 0.0 | 0.0 | 0.0 |
| Content of rubber polymer in [A] (mass %) | 15.6 | 15.9 | 16.5 | 15.2 | 15.6 |
| Ethylene-(meth)acrylic acid ester-carbon monoxide copolymer [C] (part) | | | | | |
| C-1: "ELVALOY HP-4051" | 3.0 | 5.0 | 8.0 | 3.0 | 3.0 |
| C-2: "ELVALOY HP-771" | 0.0 | 0.0 | 0.0 | 0.0 | 0.0 |
| [A] + [B] + [C] (part) | 100.0 | 100.0 | 100.0 | 100.0 | 100.0 |
| Additives (part) | | | | | |
| D-1: Lubricant | 1.0 | 1.0 | 1.0 | 1.0 | 1.0 |
| D-2: Antioxidant | 0.3 | 0.3 | 0.3 | 0.3 | 0.3 |
| D-3: Antioxidant | 1.0 | 1.0 | 1.0 | 1.0 | 1.0 |
| Evaluation results | | | | | |
| Coating defect (foaming) | A | A | A | B | A |
| Coating appearance | A | A | B | A | A |
| C-IMP (kJ/m$^2$) | 9 | 13 | 13 | 9 | 15 |
| MFR (g/10 min) | 26 | 23 | 18 | 27 | 70 |
| HDT (° C.) | 88 | 86 | 86 | 88 | 80 |
| Peeling | A | B | B | A | A |

TABLE 1-continued

| Formulation | Examples | | | |
|---|---|---|---|---|
| | 6 | 7 | 8 | 9 |
| Rubber-reinforced vinyl-based resin [A] (part) | | | | |
| A1-1: ABS | 24.0 | 40.0 | 24.0 | 24.0 |
| A2-1: AMS-based copolymer | 25.0 | 40.0 | 44.0 | 44.0 |
| A2-2: Maleimide-based copolymer | 15.0 | 0.0 | 0.0 | 0.0 |
| A2-3: AS | 28.5 | 12.5 | 24.5 | 26.5 |
| Polyester resin [B] (part) | | | | |
| B-1: PBT | 4.5 | 4.5 | 4.5 | 4.5 |
| Content of α-methyl styrene unit in [A] (mass %) | 18.9 | 30.2 | 33.3 | 32.6 |
| Content of maleimide compound unit in [A] (mass %) | 6.2 | 0.0 | 0.0 | 0.0 |
| Content of rubber polymer in [A] (mass %) | 15.6 | 25.9 | 15.6 | 15.2 |
| Ethylene-(meth)acrylic acid ester-carbon monoxide copolymer [C] (part) | | | | |
| C-1: "ELVALOY HP-4051" | 3.0 | 3.0 | 0.0 | 1.0 |
| C-2: "ELVALOY HP-771" | 0.0 | 0.0 | 3.0 | 0.0 |
| [A] + [B] + [C] (part) | 100.0 | 100.0 | 100.0 | 100.0 |
| Additives (part) | | | | |
| D-1: Lubricant | 1.0 | 1.0 | 1.0 | 1.0 |
| D-2: Antioxidant | 0.3 | 0.3 | 0.3 | 0.3 |
| D-3: Antioxidant | 1.0 | 1.0 | 1.0 | 1.0 |
| Evaluation results | | | | |
| Coating defect (foaming) | B | A | A | B |
| Coating appearance | A | B | A | A |
| C-IMP (kJ/m$^2$) | 8 | 19 | 7 | 7 |
| MFR (g/10 min) | 35 | 17 | 32 | 31 |
| HDT (° C.) | 90 | 83 | 88 | 88 |
| Peeling | A | A | B | A |

TABLE 2

| Formulation | Comparative Examples | | | | |
|---|---|---|---|---|---|
| | 1 | 2 | 3 | 4 | 5 |
| Rubber-reinforced vinyl-based resin [A] (part) | | | | | |
| A1-1: ABS | 24.0 | 24.0 | 24.0 | 24.0 | 24.0 |
| A2-1: AMS-based copolymer | 44.0 | 44.0 | 44.0 | 44.0 | 44.0 |
| A2-2: Maleimide-based copolymer | 0.0 | 0.0 | 0.0 | 0.0 | 0.0 |
| A2-3: AS | 32.0 | 29.0 | 27.5 | 19.0 | 17.5 |
| Polyester resin [B] (part) | | | | | |
| B-1: PBT | 0.0 | 0.0 | 4.5 | 10.0 | 4.5 |
| Content of α-methyl styrene unit in [A] (mass %) | 30.8 | 31.8 | 32.3 | 35.4 | 36.0 |
| Content of maleimide compound unit in [A] (mass %) | 0.0 | 0.0 | 0.0 | 0.0 | 0.0 |
| Content of rubber polymer in [A] (mass %) | 14.4 | 14.8 | 15.1 | 16.6 | 16.8 |
| Ethylene-(meth)acrylic acid ester-carbon monoxide copolymer [C] (part) | | | | | |
| C-1: "ELVALOY HP-4051" | 0.0 | 3.0 | 0.0 | 3.0 | 10.0 |
| C-2: "ELVALOY HP-771" | 0.0 | 0.0 | 0.0 | 0.0 | 0.0 |
| [A] + [B] + [C] (part) | 100.0 | 100.0 | 100.0 | 100.0 | 100.0 |
| Additives (part) | | | | | |
| D-1: Lubricant | 1.0 | 1.0 | 1.0 | 1.0 | 1.0 |
| D-2: Antioxidant | 0.3 | 0.3 | 0.3 | 0.3 | 0.3 |
| D-3: Antioxidant | 1.0 | 1.0 | 1.0 | 1.0 | 1.0 |
| Evaluation results | | | | | |
| Coating defect (foaming) | C | B | C | A | A |
| Coating appearance | A | C | A | A | C |
| C-IMP (kJ/m$^2$) | 10 | 13 | 8 | 9 | 15 |
| MFR (g/10 min) | 33 | 27 | 32 | 29 | 13 |
| HDT (° C.) | 88 | 89 | 89 | 88 | 84 |
| Peeling | A | A | A | C | C |

From Tables 1 and 2, the followings were apparently recognized.

In Examples 1 to 9 in which the conditions used were within the scope of the present invention, the resulting resin compositions were excellent in balance between coatability, impact resistance, moldability and chemical resistance, and the molded products obtained therefrom were free from coating defects and had a good coating appearance, and was inhibited from suffering from peeling.

In Comparative Example 1 in which the contents of the components [B] and [C] were less than the specific ranges defined in the present invention, the resulting coated molded product suffered from coating defect (foaming).

In Comparative Example 2 in which the content of the component [B] was less than the specific range defined in the present invention, the resulting coated molded product had a poor coating appearance.

In Comparative Example 3 in which the content of the component [C] was less than the specific range defined in the present invention, the resulting coated molded product suffered from coating defect (foaming).

In Comparative Example 4 in which the content of the component [B] was more than the specific range defined in the present invention, the resulting coated molded product suffered from peeling.

In Comparative Example 5 in which the content of the component [C] was more than the specific range defined in the present invention, the resulting coated molded product had a poor coating appearance and suffered from peeling.

Explanation of Reference Numerals

1: Test piece; 2: Gate; 3: Notches

The invention claimed is:

1. A resin composition for coating comprising 84.9 to 98.9 parts by mass of the below-mentioned rubber-reinforced vinyl-based resin [A], 1 to 8 parts by mass of a polyester resin [B] and 0.1 to 7.1 parts by mass of a copolymer [C] of ethylene, a (meth)acrylic acid ester and carbon monoxide (with the proviso that a total amount of the components [A], [B] and [C] ([A]+[B]+[C]) is 100 parts by mass):

[Rubber-reinforced vinyl-based resin [A]]

The rubber-reinforced vinyl-based resin comprising a rubber-reinforced copolymer resin [A1] obtained by polymerizing a vinyl-based monomer [b1] in the presence of a rubber polymer [a], or comprising the rubber-reinforced copolymer resin [A1] obtained by polymerizing the vinyl-based monomer [b1] in the presence of the rubber polymer [a], and a (co)polymer [A2] of a vinyl-based monomer [b2].

2. A resin composition for coating according to claim 1, wherein a content of the rubber polymer [a] is 5 to 40% by mass based on 100% by mass of the rubber-reinforced vinyl-based resin [A].

3. A resin composition for coating according to claim 1, wherein the rubber-reinforced vinyl-based resin [A] comprises a structural unit derived from α-methyl styrene and/or a structural unit derived from a maleimide-based compound, and a total content of the structural unit derived from α-methyl styrene and/or the structural unit derived from a maleimide-based compound is 10 to 50% by mass based on 100% by mass of the rubber-reinforced vinyl-based resin.

4. A resin composition for coating according to claim 1, wherein the polyester resin [B] is polybutylene terephthalate.

5. A molded product comprising the resin composition for coating as defined in claim 1.

6. A molded product according to claim 5 which is produced by an injection-molding method.

7. An exterior part for automobiles, comprising the resin composition for coating as defined in claim 1.

8. An exterior part for automobiles according to claim 7 which is produced by an injection-molding method.

9. A spoiler comprising the resin composition for coating as defined in claim 1.

10. A spoiler according to claim 9 which is produced by an injection-molding method.

* * * * *